United States Patent
Cox et al.

(10) Patent No.: US 9,970,582 B1
(45) Date of Patent: May 15, 2018

(54) SUBSEA COLLET CONNECTION SYSTEM HAVING EJECTION AND SECONDARY UNLOCKING CAPABILITY

(71) Applicant: TRENDSETTER ENGINEERING, INC., Houston, TX (US)

(72) Inventors: Brent Cox, Houston, TX (US); Jeffrey Partridge, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 0 days. days.

(21) Appl. No.: 15/337,696

(22) Filed: Oct. 28, 2016

(51) Int. Cl.
*F16L 21/06* (2006.01)
*F16L 37/62* (2006.01)

(52) U.S. Cl.
CPC .................................. *F16L 37/62* (2013.01)

(58) Field of Classification Search
CPC .......... F16L 37/08; F16L 37/002; F16L 37/62
USPC ...................... 285/33, 34, 35, 920, 322, 310
See application file for complete search history.

(56) References Cited

U.S. PATENT DOCUMENTS

| | | | |
|---|---|---|---|
| 3,523,579 A | 8/1970 | Nelson | |
| 4,477,105 A | 10/1984 | Wittman et al. | |
| 4,491,346 A * | 1/1985 | Walker | E21B 33/038 285/18 |
| 4,693,497 A | 9/1987 | Pettus et al. | |
| 4,708,376 A | 11/1987 | Jennings et al. | |
| 4,823,878 A * | 4/1989 | Brammer | E21B 33/038 166/341 |
| 6,267,419 B1 | 7/2001 | Baker et al. | |
| 2003/0168857 A1* | 9/2003 | Jennings | F16L 37/002 285/322 |
| 2010/0019485 A1* | 1/2010 | Huegerich | F04B 49/065 285/119 |
| 2014/0102711 A1* | 4/2014 | Hestetun | E21B 43/0107 166/344 |
| 2014/0361534 A1 | 12/2014 | Bekkevold | |
| 2015/0083430 A1* | 3/2015 | Jahnke | E21B 33/038 166/338 |

* cited by examiner

*Primary Examiner* — Aaron M Dunwoody
(74) *Attorney, Agent, or Firm* — Egbert Law Offices, PLLC

(57) ABSTRACT

A subsea connector system having ejection capability has a first connector with a flange extending radially outwardly therefrom and a second connector. The second connector has a hub, a housing extending around the hub, and an actuator mounted on or in the housing. The actuator is movable between an extended position and a retracted position. The actuator bears on the flange of the first connector when in the extended position so as to allow the second connector to be disengaged from the first connector. The first connector is a plurality of collet segments engageable with the hub of the second connector. The actuator causes the plurality of collet segments to separate from the hub when the actuator is in the extended position.

12 Claims, 4 Drawing Sheets

SUBSEA COLLET CONNECTION SYSTEM HAVING EJECTION AND SECONDARY UNLOCKING CAPABILITY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the connecting of external items to a subsea structure. More particularly, the present invention relates to collet-type connection systems. Additionally, the present invention relates to a collet connection system that has an ejection capability.

2. Description of Related Art Including Information Disclosed Under 37 CFR 1.97 and 37 CFR 1.98

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically-actuated collet connector which utilizes a series of segment clamps which are biased by other mechanical apparatus to releasably secure a pair of abutting flanges into a sealed assembly. Collet connectors and other acceptable connector mechanisms are generally utilized for connection of the wellhead valve system with the production system of the wellhead so that the wellhead valve assembly may be disconnected and removed in the event that replacement or repair is necessary.

A multi-well subsea assembly can include subsea structures such a subsea trees, manifolds, and/or pipeline end terminations. These subsea structures can be interconnected by jumpers. The jumpers mate up with the subsea structures using connectors that mate with hubs on the subsea structures. Production is often routed from the trees in the gathering manifolds and from the gathering manifolds to pipeline end terminations and pipelines to the platform.

When dealing with subsea applications, it becomes necessary to simplify or eliminate the use of divers during the locking of a connector in order to secure the connection between the drilling or piping components in the wellhead. Hydraulically-actuated collet connectors have been developed and utilized for this purpose. These collet-type connectors are designed for high pressure in deepwater drilling operations. The collet connectors are secured over the mating sections of the drilling or piping components to be connected by use of hydraulic pressure. Because the hydraulic pressure can be controlled remotely, it is not necessary for divers to lock the collet connector in order to secure the connection.

There are several problems associated with existing collet connectors. First, there is a possibility that one connector cannot separate from the other connector after the unlocking procedure is completed. Second, it becomes difficult to separate the connectors if the hydraulic system required for the unlocking should be compromised or damaged.

In prior collet connection systems, the systems were effective in achieving a locking between the connectors. However, in certain conditions, as a result of corrosion, adhesion, or other forces, the connectors do not always separate when the collet segments are unlocked. As a result, external appliances are required in order to completely disengage the connectors. Often, this is a very time-consuming, expensive and difficult procedure. As such, a need has developed so as to be able to eject one connector from the other connector upon an unlocking of the collet segments. It is also important to have an ability to achieve an unlocking of the connectors in the event that the primary locking mechanism should fail.

In order to allow for the proper connection and disconnection of hubs in the subsea environment, it is necessary to properly join such hubs in the subsea environment. Once the hubs are joined, then a liquid, chemical, or other fluid, can flow through the connector so as to be delivered to the tubing that is connected to the hubs or to a structure that is connected to one of the hubs. Under certain circumstances, it is desirable to release the connection of the hubs in the subsea environment. Unfortunately, when such hubs are disconnected, there will be a release of residual fluid into the subsea environment. This can produce environmental consequences. As such, a need has developed so as to be able to effectively close the interior passageways of the connected hubs upon the release of one hub from the other.

Subsea connectors are known that can be suitably connected through the use of a remotely-operated vehicle (ROV). Typically, the ROV will travel to the subsea structure, manipulate the hubs, and then apply a torque tool to the actuator of one of the connectors so as to achieve this connection. However, it would be desirable to avoid the need to use the ROV so as to achieve the proper connection. Importantly, it would be desirable to be able to send remote signals so as to carry out the necessary operations whereby the connector can be properly used and manipulated so as to connect the hubs.

In the past, various patents and patent application publications have issued with respect to collet-type connectors. For example, U.S. Pat. No. 3,523,579, issued on Aug. 11, 1970 to N. A. Nelson, describes a wellhead valve assembly which includes a plurality of hydraulically-actuated valves and an appropriate hydraulic fluid supply system for actuation of the valves. A hydraulically-actuated collet connector is provided for connecting production flow conduits and hydraulic fluid supply conduits to the wellhead valve assembly. The collet connector includes a means for remotely detecting leakage of production fluid or hydraulic fluid in the event that the joint between the wellhead valve assembly and the hydraulic collet connector should fail to properly seal.

U.S. Pat. No. 4,477,105, issued on Oct. 16, 1984 to Wittman et al., teaches a collet-actuated ball-and-socket connector. This connector is for connecting the ends of two pipes. A ball coupling member is adapted for connection to the end of one of the pipes. A retaining flange is freely disposed about the ball coupling member and engages the outer surface of the member. A socket coupling member is adapted for connection to the end of the other of the two pipes and provided for accepting the ball coupling member so as to provide a metal sealing ring for mating with the ball members. A collet locking means is mounted about the outer periphery of the socket coupling member and extends generally axially therefrom for permitting insertion of the ball coupling member in mating engagement with the socket coupling member when the collet means is open. An actuating means applies a predetermined axial force to the collet locking means for closing the collet means to engage the retaining flange and lock the ball-and-socket coupling members together in a sealed rigid relationship.

U.S. Pat. No. 4,693,497, issued on Sep. 15, 1987 to Pettus et al., describes a remotely-actuated collet connector which is suitable for joining tubular members with similar or different end preparations or profiles. The collet connector includes a housing to support the connector from a first tubular member, a plurality of collet fingers or segments mounted within the housing and around the exterior of the first tubular member, and an actuator ring surrounding the fingers to move the fingers to a release or latch position, and a pressure responsive means for moving the actuator ring. Each of the collet fingers has a first engaging surface and an adapter secured to the finger and also has a second engaging surface. The first engaging surface mates with the end profile of the first tubular member. The second engaging surface mates with the end profile of the second tubular member so that when the collet fingers are moved to the latch position they secure the first and second tubular members together.

U.S. Pat. No. 4,708,376, issued on Nov. 24, 1987 to Jennings et al., shows a collet-type connector having an upper body member having a plurality of collet segments, a cam ring movable relative to the upper body member to move the collet segments into a detachable connection with the connector of a subsea wellhead. The cam ring and the collet segments have sets of camming surfaces whereby a first set is cooperative to pivot the collet segments initially toward the wellhead and whereby a second set serves to urge the collet segments further to clamp the connector to the subsea wellhead. When the second set of camming surfaces function, the first set no longer functions to rotate the collet segments so as to reduce the power requirements for urging the collet segments into clamping engagement.

U.S. Pat. No. 6,267,419, issued on Jul. 31, 2001 to Baker et al., shows a remotely actuated clamping connector. The clamping connector includes clamp halves linked by a locking stem. The locking stem is forced into a pre-stressed state by moving the locking stem from a first relaxed position to a second pre-stressed position and retained in the second pre-stressed position by a locking collet. A locking collet through which the locking stem extends is moved from a first unlocked position to a second locked position wedged between the locking stem and one or the other of the clamp halves. When the locking collet is in the second locked position, it resists movement of the locking stem from the second pre-stressed position to the first relaxed position. The locking collet is then locked in the second locked position.

U.S. Patent Application Publication No. 2014/0361534, published on Dec. 11, 2014 to K. Bekkevold, describes a connector having a plurality of latching fingers arranged around a cylindrical body and having a central axis. Each finger has a first end region extending beyond an end of the body includes a first latching structure. Each finger is pivotally supported at an intermediate region by a portion of the body and is movable between a non-latching position and a latching position in which the first end region is closer to the central axis than in the non-latching position. The connector includes a first actuated member arranged in contact with a plurality of fingers and operable to move the fingers between the non-latching position and the latching position. An actuator is operable to force a second end region of each finger toward the body. The connector can be connected to a hub by bringing the connector face into contact with a hub face, moving the latching fingers toward the connector until the first latching structures are engaged in corresponding second latching structures on the hub, and then holding the latching structures together in a latching engagement.

U.S. patent application Ser. No. 14/748,779, filed on Jun. 24, 2015 to the preset Applicant, describes a subsea connection system for connecting to a hub. The subsea connection system has a body with an interior passageway suitable for allowing fluids to flow therethrough, a collet having a plurality of collet segments that are movable between a locked position and unlocked position, an outer sleeve overlying the collet, and a translator cooperative with the outer sleeve so as to move the outer sleeve between a first position and a second position. The plurality of collet segments are in the unlocked position when the outer sleeve is in the first position. The plurality of collet segments are in the locked position when the outer sleeve is in the second position. The locked position secures the body in connection to the hub.

It is an object of the present invention to provide a collet connection system that allows for the ability to eject one connector from another connector.

It is another object of the present invention to provide a collet connection system which avoids the need for external appliances in order to achieve a proper separation of the connectors.

It is another object of the present invention provide a collet connection system which effectively establishes a secure connection between flow passageways within the connectors.

It is another object of the present invention to provide a collet connection system which can provide a secondary unlocking of the connectors.

It is another object of the present invention to provide a collet connection system in which the ejection of one connector from the other connector is achieved in a simple, fast, and efficient manner.

It is still another object of the present invention to provide a collet connection system that can effectively operate as a vertical connector in a subsea environment.

It is still another object of the present invention provide a collet connection system which avoids the release of polluting elements in the subsea environment.

These and other objects and advantages of the present invention will become apparent from a reading of the attached specification and appended claims.

BRIEF SUMMARY OF THE INVENTION

The present invention is a subsea connector system that comprises a first connector and a second connector. The first connector has a body with an interior passageway adapted to allow a fluid to flow therethrough, a collet having a plurality of collet segments that are movable between a locked position and an unlocked position, an outer sleeve overlying the collet, and a translator cooperative with the outer sleeve so as to move the outer sleeve forwardly so as to cause the plurality of collet segments to be in the locked position. The second connector includes a hub having a flow passageway adapted to allow a fluid to flow therethrough, a housing extending around the hub, and an actuator mounted on or in the housing. The plurality of collet segments engage the hub when in the locked position. The actuator is movable between an extended position and a retracted position. The actuator bears on a surface of the outer sleeve when in the extended position or on a surface extending outwardly of the outer sleeve of the first connector.

The outer sleeve has a flange extending radially outwardly thereof. The actuator has an end bearing against the flange. The actuator urges the outer sleeve rearwardly when in the extended position. The outer sleeve is movable rearwardly so as to urge the plurality of collet segments toward the unlocked position.

The actuator includes a plurality of actuators arranged in circumferentially spaced relation around the housing. In particular, the actuator includes a cylinder formed on an interior of the housing outwardly of the hub, a piston slidably movable in the cylinder, and a piston rod affixed to the piston and having an end extending outwardly which is adapted to selectively bear against the surface of the sleeve.

The plurality of collet segments and at least a portion of the outer sleeve are received in an interior of the housing when the plurality of collet segments are in the locked position. The interior passageway of the body is in fluid communication with the flow passageway of the hub when the plurality of collet segments are in the locked position. The outer sleeve has an inner surface that bears against the outer surface of the plurality of collet segments as the outer sleeve moves forwardly and rearwardly. The movement of the outer sleeve rearwardly causes the plurality of collet segments to move to the unlocked position. The outer sleeve has a tapered surface at an end thereof that bears against an outwardly tapered surface at an end of the collet segments so as to cause the collet segments to move to the locked position. The outer sleeve has a tapered interior surface inwardly of the end thereof. The collet segments have an angled surface at an inner end thereof The tapered interior surface of the outer sleeve bears against the angled surface of the collet segments so as to cause the collet segments to move to the unlocked position when the outer sleeve moves rearwardly.

In the present invention, the translator comprises a hydraulic circuit formed through the body so as to open the space between an exterior of the body in an interior of the sleeve. The present invention further includes a first poppet position in the interior passageway of the body at an end of the body and a second poppet position in the flow passageway of the hub adjacent to an end of the hub. The first poppet engages the second poppet when the plurality of collet segments are in the locked position. The first and second poppets respectively close the interior passageway and the flow passageway when the plurality of collet segments are in the unlocked position. As such, when the first connector is separated from the second connector, the first and second poppets serve to block fluid flow outwardly of the respective interior passageway and flow passageway so as to prevent the release of pollutants into the subsea environment.

The foregoing Section is intended describe, with particularity, the preferred embodiment of the present invention. It is understood that modifications to this preferred embodiment can be made within the scope of the present claims. As such, the Section should not be construed, in any way, as limiting of the broad scope of the present invention. The present invention should only be limited by the following claims and their legal equivalents.

DETAILED DESCRIPTION OF THE INVENTION

Figure 1:
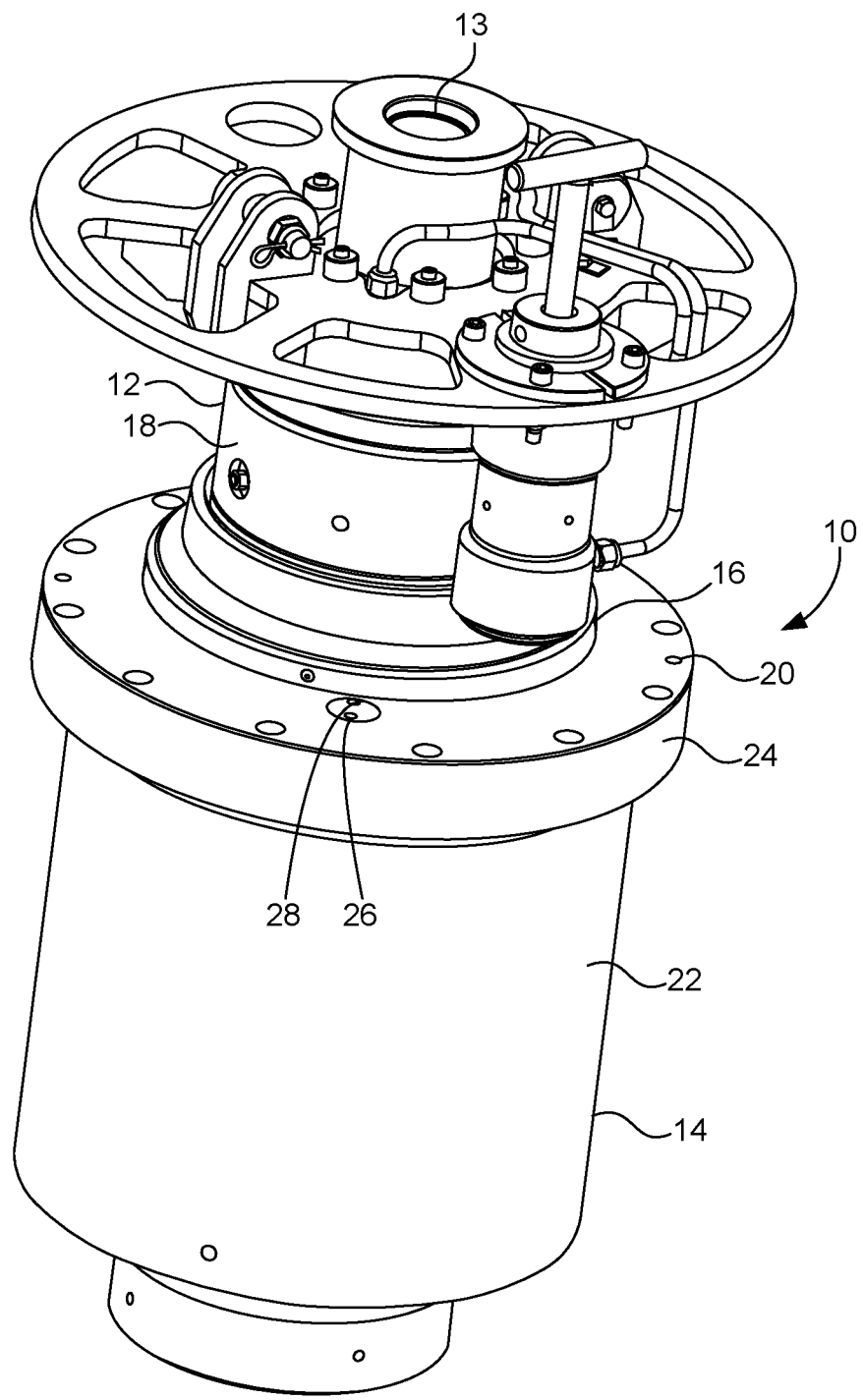
FIG. 1 is a perspective view of the subsea connector system of the present invention showing the connectors as joined together.

Referring to FIG. 1, there is shown the subsea connection system 10 in accordance with the teachings of the present invention. The subsea connection system 10 includes a first connector 12 and a second connector 14. The first connector 12, as will be described hereinafter, is a collet connection system. An interior passageway 13 will extend through the interior of the first connector 12 so as to join with a flow passageway formed in the second connector 14. A flange 16 is affixed to or formed with a sleeve 18. The sleeve 18, along with the flange 16, will be movable in relation to the mechanism on the interior of the first connector 12. In FIG. 1, it can be seen that the flange 16 is adjacent to an upper surface 20 of the second connector 14.

The second connector 14 has a housing 22 of a substantially cylindrical shape. A flange body 24 will extend outwardly of the housing 22 at the upper end thereof There are a plurality of openings 26 that are formed in the upper flange 24. These openings 26 are illustrated as located directly below the lower surface of the flange 16. An upper end of a piston rod 28 is shown as emerging from the opening 26. As will be described hereinafter, this end of the piston rod 28 can bear against the flange 16 so as to urge the separation of the first connector 12 from the second connector 14.

Figure 2:
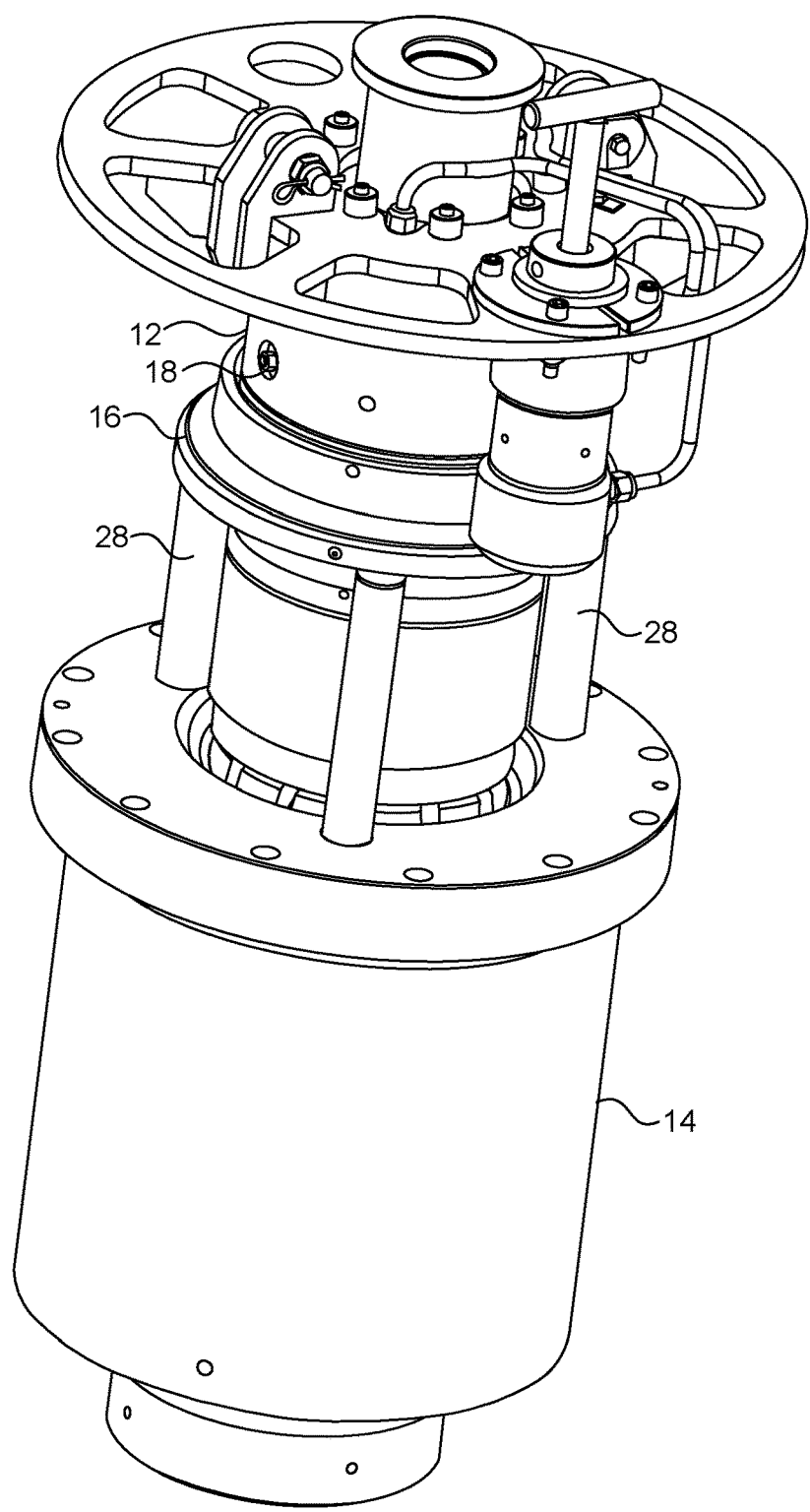
FIG. 2 is a perspective view of the subsea connector system of the present invention with the connectors being separated from each other.

FIG. 2 shows the action of separating the first connector 12 from the second connector 14. In subsea connections, it is important to be able to eject the first connector 12 from the second connector 14. The present invention provides an actuator which serves to force the first connector 12 from the second connector 14 so that these connectors can separate in the subsea environment without external appliances. Also, the present invention provides a system for moving the outer sleeve 18 and for unlocking the collet segments.

As can be seen in FIG. 2, there are a plurality of piston rods 28 that emerge from the openings 26 and bear against the underside of the flange 16. As such, this causes the sleeve 18 to move rearwardly and to cause the first connector 12 to separate from the second connector 14. The end of the first connector 12 is illustrated as separated from the upper end of the second connector 14.

Figure 3:
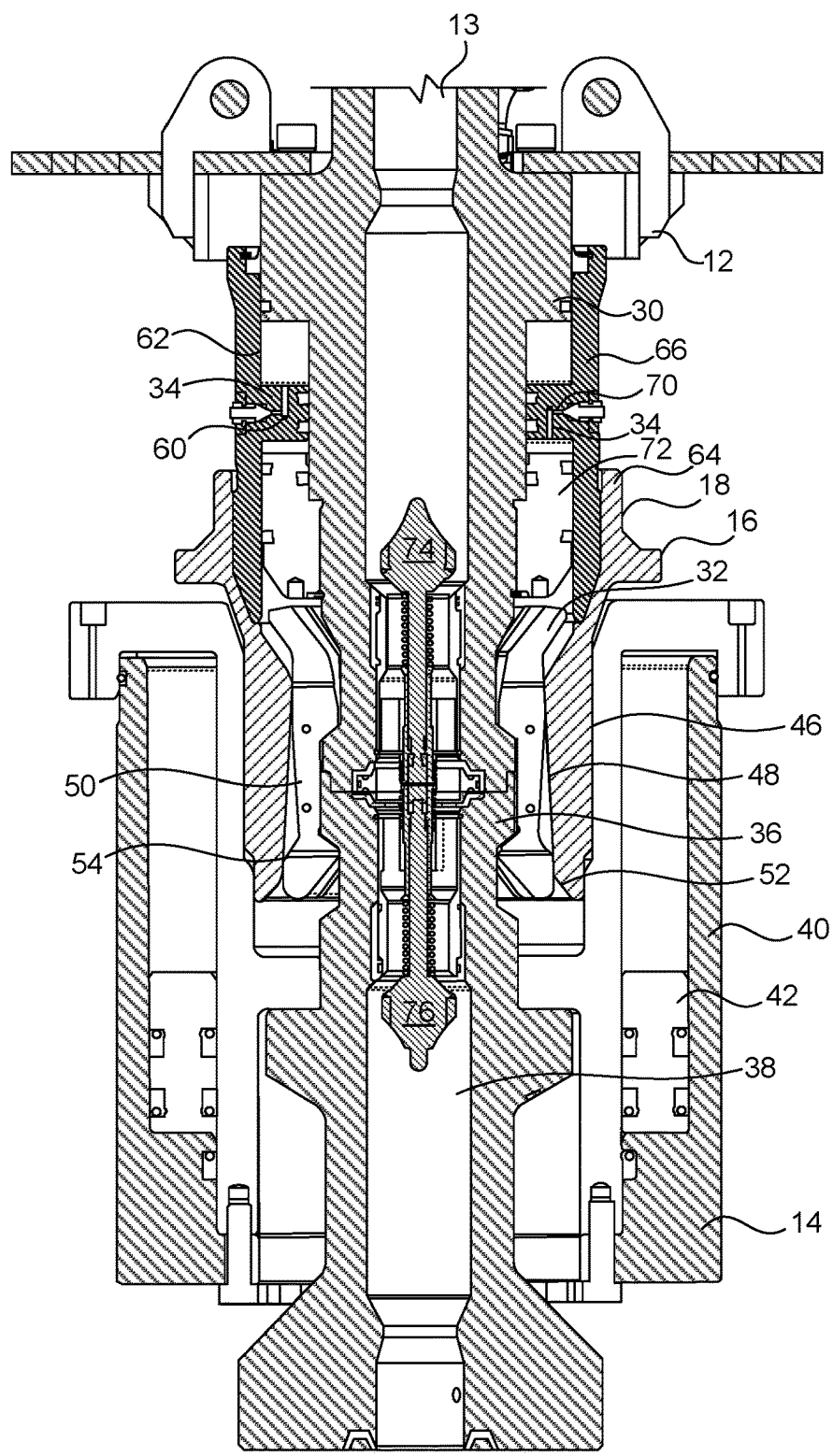
FIG. 3 is a cross-sectional view of the subsea connector system of the present invention showing the connectors as connected together.

FIG. 3 is a cross-sectional view showing the relationship between the first connector 12 and the second connector 14 when the connectors are locked together. The first connector 12 includes a body 30 which has the interior passageway 14 extending therethrough. A collet having a plurality of collet segments 32 is located over the end of the body 30 at one end thereof. The collet segments 32 are movable between a locked position and an unlocked position. In FIG. 3, the collet segments 32 are shown in the locked position. An outer sleeve 18 overlies the collet having the plurality of collet segments 32. A translator 34 is cooperative with the outer sleeve 18 so as to move the outer sleeve forwardly so as to cause the plurality of collet segments 32 to be in the locked position.

The second connector 14 has a hub 36 having a flow passageway 38 adapted to allow a fluid to flow therethrough. It can be seen that the plurality of collet segments 32 are engaged with the hub 36 when the plurality of collet segments 32 are in the locked position. A housing 40 extends around the hub 36. An actuator 42 is mounted on or in the housing 40. The actuator 42 is movable between an extended position and a retracted position. The retracted position shown in FIG. 3.

In FIG. 3, it can be seen that the outer sleeve 18 has the flange 16 extending radially outwardly thereof. The housing 40 has an interior 46 surrounding the hub 36. In FIG. 3, with the plurality of collet segments 32 in the locked position, both a portion of the outer sleeve 18 and the plurality of collet segments 32 are received in this interior 46 of the housing 40. In this configuration, the interior passageway 13 of the body 30 is in fluid communication with the flow passageway 38 of the hub 36 when the plurality of collet segments 32 are in the locked position.

The outer sleeve 18 has an inner surface 48 which bears against an outer surface 50 of the plurality of collet segments 32. The outer sleeve 18, as will be described hereinafter, moves forwardly and rearwardly. The movement of the outer sleeve rearwardly will operate to cause the plurality of collet segments 32 to move to the unlocked position. In particular, the outer sleeve 18 has a tapered surface 52 at an end thereof. This tapered surface 52 will bear against an outwardly tapered surface 54 of the collet segments 32 so as to cause the collet segments 32 to move to the locked position. Ultimately, it can be seen that the end of the sleeve 18 will entirely overlie the back surface of the forward and of the collet segment 32 so as to securely lock the collet segments 32 over the hub 36. This closed relation is further enhanced by the fitting of the sleeve 16 within the interior 46 of the housing for of the housing 40.

The movement of the outer sleeve 18 is carried out by the use of the translator 34. In particular, the translator 34 includes a hydraulic circuit 60 so as to allow hydraulic fluid to be injected into a space 62 located between the inner surface of the sleeve 18 and the body 30. In particular, it can be seen that the sleeve 18 has a first portion 64 and a second portion 66 that are affixed together. The injection of hydraulic fluid through the channel 60 will fill the space 62 so as to urge the sleeve 18 forwardly and thereby to urge the plurality of collet segments 32 over the hub 36 and into engagement over a shoulder of the hub 36. In order to move the sleeve 18 rearwardly and away from the ends of the collet segments 32, the translator 34 includes another hydraulic circuit 70. As such, when hydraulic fluid is introduced through circuit 70, the fluid will enter a space between the member 72, the body 30, and the interior of the sleeve 18. At the same time, the hydraulic fluid in the space 62 will be evacuated through the hydraulic circuit 60 so that this movement occurs.

FIG. 3 shows that there is a first poppet 74 and a second poppet 76. The first poppet 74 has an end that is in abutment with the second poppet 76. Since the interior passageway 13 is intended to be in fluid communication with the flow passageway 38, the ends of the poppets 74 and 76 abut each other so as to cause the poppets 74 and 76 to be spaced away from the respective shoulders on the interiors of the interior passageway 13 and the flow passageway 38. The force of abutment between the first poppet 74 and the second poppet 76 will overcome the resistance created by the respective springs. Also, the end of the hub 36 is shown in tight abutment with the end of the body 30 so as to be in a tight sealing relationship therewith. A seal can be positioned at the end of the body 30 so as to further facilitate the tight sealing relationship between the end of the hub 36 and the end of the body 30. Since the poppets 74 and 76 are separated from their seated position against the respective shoulders in the interior passageway 13 and the flow passageway 38, a fluid flow connection is established between the hub 36 and the body 30.

Figure 4:
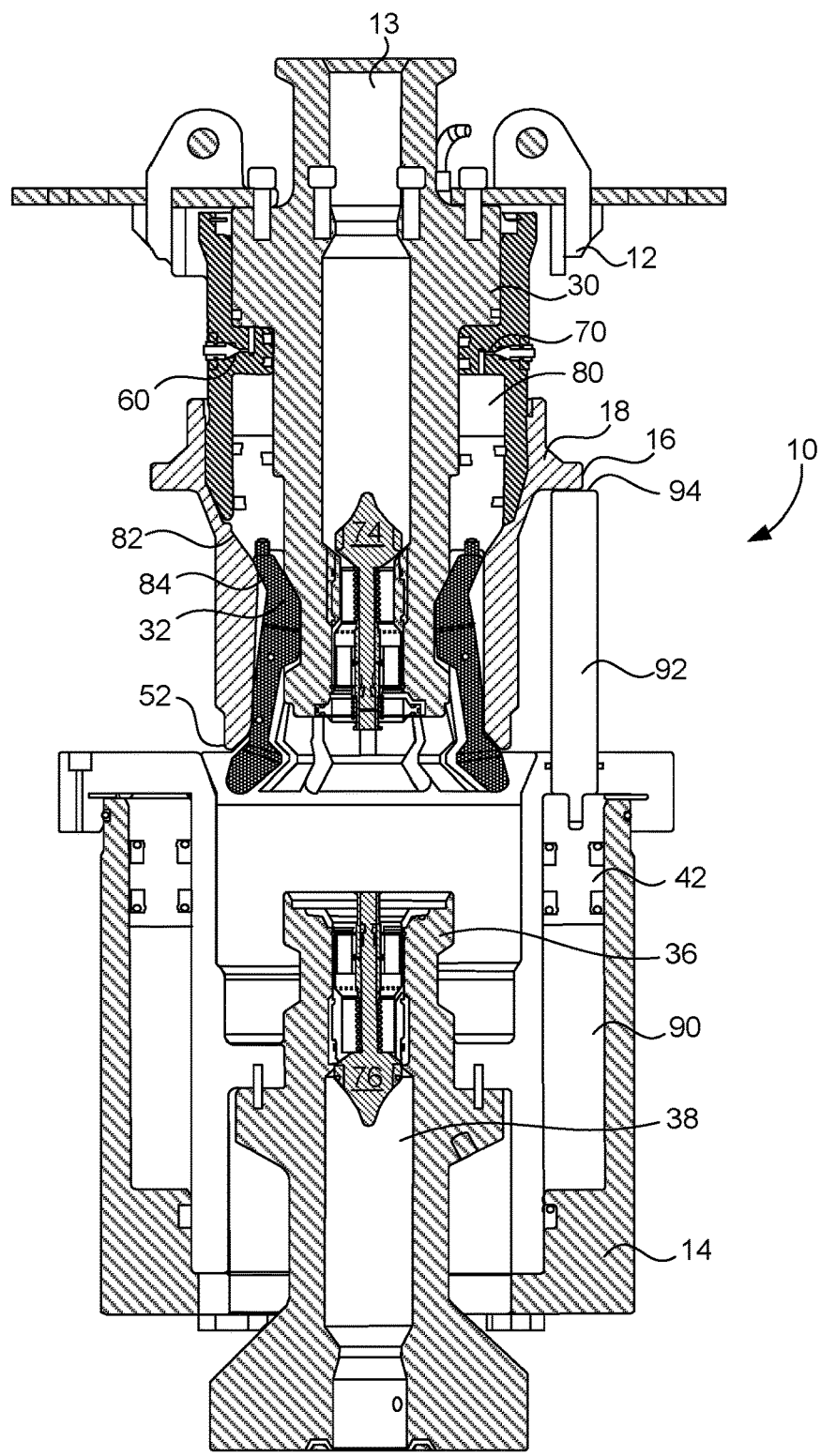
FIG. 4 is a cross-sectional view of the subsea connection system of the present invention showing the separation of the connectors.

FIG. 4 shows the separation of the first connector 12 from the second connector 14. In normal use, the separation would easily be accomplished by simply moving the collet segments 32 to their unlocked position. This is achieved by injecting hydraulic fluid through the hydraulic circuit 70 so as to fill a space 80. This urges the outer sleeve 16 rearwardly. The fluid in the space 62 has been evacuated through channel 60. As the outer sleeve 16 is retracted, a tapered interior surface 82 of the sleeve 16 will bear against an angled surface 84 of the collet segment 32. This relationship will pivot the forward ends of the plurality of collet segments 32 outwardly so as to separate from the hub 36. The tapered surface 52 at the end of the outer sleeve 16 will travel over the forward end of the collet segments 32 so as to allow the outward movement of the end of the collet segments 32. In this configuration, it can be seen that the first poppet 74 will be seated against the inner shoulder on the interior passageway 13 of the body 30. This will block fluid flow outwardly of the interior passageway 18 of the first connector 12. Similarly, the second poppet 76 will be seated against the interior shoulder of the flow passageway 38 of the second connector 14 by the action of the spring. Once again, fluid flow is prevented from leaving the hub 36 by action of the poppet 76. The separation of the ends of the respective poppets 74 and 76 allow the respective springs to cause the poppet 74 and 76 to move to their fluid-sealing positions.

It has been found that, under certain circumstances, the plurality of poppet segments 34 are in their unlocked position and separated from the hub 36. However, the first connector 12 is not separated from the second connector 14. This may be the action of corrosion, adhesion, or other factors. As such, for purposes of assuring a proper ejection of the first connector 12 from the second connector 14, the second connector 14 has a particular mechanism so as to cause a positive separation of the first connector 12 from the second connector 14. This mechanism can also serve to force the collet segments open in the rare event of a failure of the hydraulics or hydraulic circuits.

In particular, the second connector 14 has a cylinder 90 formed therein. The piston 42 is slidably positioned within the cylinder 90. A piston rod 92 is affixed to the piston 42 so as to travel with the movement of the piston 42. A hydraulic circuit can be established so as to inject hydraulic fluid into the cylinders 90 so as to cause the piston 42 to travel forwardly and cause the piston rod 92 to move upwardly.

FIG. 4 shows that the end surface 94 of the piston rod 92 bears against the flange 16. As such, this will force the first connector 12 away from the second connector 14. In other circumstances, however, there could possibly be a failure of the hydraulic circuits 60 and 70. As such, it would not be possible to move the outer sleeve 18 rearwardly so as to cause the plurality of collet segments 32 to separate from the hub 36. As such, the present invention provides a back-up or failsafe capability to the connection system 10. In particular, if there is a failure of the hydraulic circuits 60 or 70 such that the rearward movement of the outer sleeve 18 was not possible, then the actuator of the second connector 14 can be used so as to force this rearward movement. As the piston rod 92 urges against the flange 16, the force of this urging forces the outer sleeve 18 to move rearwardly and, as a result, causes the interior tapered surface 84 of they outer sleeve 18 to bear against the angled surface 84 of the collet segment 32 so as to force the collet segments 32 to pivot outwardly and separate from the hub 36. As such, the present invention achieves a proper separation of the first connector 12 from the second connector 14 under emergency conditions.

As the second connector 14 drops away from the first connector 12, the collet segments 32 will separate from the hub 36 and the poppets 74 and 76 will move to a fluid-blocking seated position so that discharge into the subsea environment is prevented.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A subsea connector system comprising:
  a first connector comprising:
    a body having an interior passageway adapted to allow a fluid to flow therethrough;
    a collet having a plurality of collet segments that are movable between a locked position and an unlocked position;
    an outer sleeve overlying said collet;
    a translator cooperative with said outer sleeve so as to move said outer sleeve forwardly so as to cause said plurality of collet segments to be in the locked position;
  a second connector comprising:
    a hub having a flow passageway adapted to allow a fluid to flow therethrough, said plurality of collet segments engaging said hub when in said locked position;
    a housing extending around said hub; and
    an actuator mounted on or in said housing, said actuator movable between an extended position and a retracted position, the extended position of said actuator bearing on a surface of said outer sleeve on a surface extending outwardly of said outer sleeve of said first connector;
    a first poppet positioned in said interior passageway of said body at an end of said body; and
    a second poppet positioned in said flow passageway of said hub adjacent an end of said hub, said first poppet engaging said second poppet when said plurality of collet segments are in the locked position, said first and second poppets respectively closing said interior passageway and said flow passageway when said plurality of collet segments are in the locked position.

2. The subsea connector system of claim 1, said outer sleeve having a flange extending radially outwardly thereof, said actuator having an end bearing against said flange.

3. The subsea connector system of claim 2, said actuator urging said outer sleeve rearwardly when in said extended position.

4. The subsea connection system of claim 1, said outer sleeve movable rearwardly so as to urge said plurality of collet segments toward said unlocked position.

5. The subsea connection system of claim 1, said actuator comprising a plurality of actuators arranged in circumferentially spaced relation around said housing.

6. The subsea connector system of claim 1, said actuator comprising:
  a cylinder formed in an interior of said housing outwardly of said hub;
  a piston slidably received in said cylinder; and
  a piston rod affixed to said piston and movable in relation to said piston within said cylinder, said piston rod having an end adapted to selectively bear against the surface of said outer sleeve.

7. The subsea connector system of claim 1, said plurality of collet segments and at least a portion of said outer sleeve received in an interior of said housing when said plurality of collet segments are in said locked position.

8. The subsea connector system of claim 7, said interior passageway of said body being in fluid communication with said flow passageway of said hub when said plurality of collet segments are in said locked position.

9. The subsea connector system of claim 1, said outer sleeve having an inner surface that bears against an outer surface of said plurality of collet segments as said outer sleeve moves forwardly and rearwardly, the movement of said outer sleeve rearwardly causing said plurality of collet segments to move to said unlocked position.

10. The subsea connector system of claim 9, said outer sleeve having a tapered surface at an end thereof that bears against an outwardly tapered surface at an outer end of the collet segment so as to cause the collet segment to move to the locked position.

11. The subsea connector system of claim 10, said outer sleeve having a tapered interior surface inwardly of said end, the collet segment having an angled surface at an inner end thereof, said tapered interior surface of said outer segment bearing against said angle surface of the collet segments so as to cause the collet segment to move to the unlocked position when the outer sleeve moves rearwardly.

12. The subsea connector system of claim 1, said translator comprising:
  a hydraulic circuit formed through said body so as to open to the space between an exterior of said body and an interior of said sleeve.

\* \* \* \* \*